United States Patent
Yoshida et al.

(10) Patent No.: US 7,771,856 B2
(45) Date of Patent: Aug. 10, 2010

(54) ENERGY OUTPUT DEVICE AND CONTROL METHOD OF ENERGY OUTPUT DEVICE

(75) Inventors: Naohiro Yoshida, Nisshin (JP); Hiroaki Mori, Kasugai (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 1297 days.

(21) Appl. No.: 10/557,579

(22) PCT Filed: Jun. 25, 2004

(86) PCT No.: PCT/JP2004/009448

§ 371 (c)(1),
(2), (4) Date: Nov. 21, 2005

(87) PCT Pub. No.: WO2005/004269

PCT Pub. Date: Jan. 13, 2005

(65) Prior Publication Data

US 2007/0054165 A1    Mar. 8, 2007

(30) Foreign Application Priority Data

Jul. 2, 2003    (JP) .............................. 2003-189977

(51) Int. Cl.
H01M 8/04 (2006.01)
(52) U.S. Cl. .......................................... 429/23; 429/22
(58) Field of Classification Search ................... 429/22, 429/23, 34
See application file for complete search history.

(56) References Cited

U.S. PATENT DOCUMENTS

| 2001/0012575 A1 | 8/2001 | Katagiri et al. |
| 2002/0009623 A1 | 1/2002 | St-Pierre et al. |
| 2003/0134165 A1* | 7/2003 | Reiser et al. .................. 429/13 |
| 2004/0034460 A1* | 2/2004 | Folkerts et al. ................ 701/54 |
| 2005/0042485 A1 | 2/2005 | Murayama |

FOREIGN PATENT DOCUMENTS

| EP | 0 751 045 B1 | 1/1997 |
| GB | 1 447 835 | 9/1976 |
| JP | A 2001-224105 | 8/2001 |
| JP | A 2001-307758 | 11/2001 |
| JP | A-2003-151601 | 5/2003 |
| WO | WO 03/034528 A1 | 4/2003 |
| WO | WO 2004/021493 A1 | 3/2004 |

* cited by examiner

*Primary Examiner*—Patrick Ryan
*Assistant Examiner*—Muhammad Siddiquee
(74) *Attorney, Agent, or Firm*—Oliff & Berridge, PLC

(57) ABSTRACT

In a power supply device including a fuel cell unit with a stack of fuel cells or a fuel cell stack and a secondary battery, an intermittent drive mode is selected under a preset condition to receive power supply only from the secondary battery. The control procedure of the invention determines whether a temporary stop of the fuel cell stack or continuance of the stop of the fuel cell stack leads to potential performance deterioration of the fuel cell stack at a restart of the fuel cell unit. In response to estimation of the potential performance deterioration, the control procedure controls the power supply device to continue or start power generation of the fuel cell stack, regardless of selection of the intermittent drive mode under the preset condition.

16 Claims, 7 Drawing Sheets

ENERGY OUTPUT DEVICE AND CONTROL METHOD OF ENERGY OUTPUT DEVICE

TECHNICAL FIELD

The present invention relates to an energy output device that has multiple energy output sources including fuel cells and activates at least one of the multiple energy output sources to output energy, as well as to a control method of such an energy output device.

BACKGROUND ART

A known energy output device with multiple energy output sources including fuel cells is a power supply device having a secondary battery and fuel cells. In this power supply device, the control procedure stops power generation of the fuel cells and supplies electric power only from the secondary battery, when a load receiving a supply of electric power from the power supply device is in a preset low loading state. This control is based on the characteristic of the fuel cells that the total energy efficiency of the fuel cells is lowered in the low loading state. The control of stopping the operation of the fuel cells and activating only the secondary battery in the low loading state desirably enhances the overall efficiency of the power supply device.

At the time of a restart of the fuel cells in response to an increase of the load after the temporary stop of power generation of the fuel cells in the low loading state, however, there may be a disadvantage like a delayed response of power generation or a lowered voltage of a unit cell. Such disadvantage may be ascribed to, for example, condensation of water produced in the course of power generation in a gas flow path of the fuel cells or a partial decrease in moisture of electrolyte membranes in the case of polymer electrolyte fuel cells. The control of stopping power generation of the fuel cells based on the overall efficiency of the power supply device may thus not attain the theoretical high-efficient operation of the power supply device. The problem that a stop of power generation of the fuel cells may cause the above disadvantage at a restart of the fuel cells is commonly found in the control of stopping power generation of fuel cells under a preset condition in a general energy output device with multiple energy output sources including fuel cells.

DISCLOSURE OF THE INVENTION

The object of the invention is thus to control stop of fuel cells and thereby prevent a potential trouble arising in the fuel cells at a restart of the fuel cells.

In order to attain at least part of the above and the other related objects, the present invention is directed to a first energy output device that has multiple energy output sources including fuel cells and activates at least one of the multiple energy output sources to output energy. The first energy output device includes: an output control module that stops power generation by the fuel cells under a preset condition and activates an energy output source other than the fuel cells included in the energy output device to output energy; an estimation module that carries out estimation during power generation of the fuel cells, where the estimation determines whether a temporary stop of the fuel cells leads to a potential performance deterioration of the fuel cells at a restart of the fuel cells; and a forced FC operation module that, when the estimation module estimates the potential performance deterioration of the fuel cells, forcibly continues power generation of the fuel cells even under the preset condition.

The first energy output device of the invention continues power generation of the fuel cells, in response to estimation of the potential performance deterioration of the fuel cells. This arrangement effectively prevents or at least restrains the potential performance deterioration of the fuel cells at a restart of the fuel cells.

In the first energy output device of the invention, the potential performance deterioration of the fuel cells may be deterioration of a current-voltage characteristic of the fuel cells. Continuance of power generation of the fuel cells desirably prevents or at least restrains deterioration of the current-voltage characteristic of the fuel cells.

In one preferable embodiment of the first energy output device of the invention, the estimation module estimates the potential performance deterioration of the fuel cells when a concentration of an impurity included in an electrode active substance-containing gas supplied to the fuel cells is not lower than a preset level. This arrangement desirably prevents or at least restrains deterioration of the current-voltage characteristic of the fuel cells, due to a raised concentration of the impurity in the electrode active substance-containing gas.

In this preferable embodiment of the invention, the first energy output device further includes: a hydrogen gas supply conduit that leads a supply of hydrogen gas to anodes of the fuel cells; and an exhaust circulation conduit that leads at least part of anode exhaust discharged from the anodes of the fuel cells to the hydrogen gas supply conduit. The estimation module estimates the potential performance deterioration of the fuel cells when the concentration of the impurity included in the anode exhaust led to the hydrogen gas supply conduit is not lower than the preset level.

This arrangement desirably prevents or at least restrains deterioration of the current-voltage characteristic of the fuel cells, due to a raised concentration of the impurity in the anode exhaust through circulation of at least part of the anode exhaust to the anodes.

In the first energy output device of this arrangement, the exhaust gas circulation conduit preferably has a gas purge unit that releases part of the anode exhaust to outside of the energy output device. The estimation module estimates the potential performance deterioration of the fuel cells when a time period elapsing since a latest operation of the gas purge unit to release part of the anode exhaust is within a preset reference time.

Immediately after the operation of the gas purge unit to release part of the anode exhaust, the concentration of the impurity is lowered in the neighborhood of the gas purge unit in the gas flow path, whereas the concentration of the impurity is still kept at a relatively high level in the residual area of the gas flow path including inside the fuel cells. The high concentration of the impurity in the gas supplied to the fuel cells is thus expected when the time period elapsing since the last operation of the gas purge unit is within the preset reference time.

The first energy output device of the invention may further include a hydrogen dilution module that dilutes part of the anode exhaust released by the gas purge unit with cathode exhaust discharged from cathodes of the fuel cells and releases the diluted anode exhaust to the outside of the energy output device.

This arrangement effectively prevents or at least restrains the disadvantageous discharge of a relatively high concentration of hydrogen at a restart of the fuel cells. When only a short time has elapsed since the last release operation of the anode exhaust, a relatively high concentration of hydrogen may be present in the hydrogen dilution module. A stop of the fuel cells interferes with dilution of hydrogen with the cathode exhaust. The relatively high concentration of hydrogen remaining in the hydrogen dilution module is thus released from the hydrogen dilution module at a restart of the fuel cells to resume supply of the cathode exhaust. The arrangement of the invention, however, prevents or at least restrains such a potential disadvantage.

In the first energy output device of the invention, the estimation module may estimate the potential performance deterioration of the fuel cells when an output voltage of the fuel cells relative to an output current is not greater than a preset reference voltage relative to the output current. This arrangement effectively prevents or at least restrains the potential deterioration of the current-voltage characteristic of the fuel cells.

In the first energy output device of the invention, the estimation module may estimate the potential performance deterioration of the fuel cells when an operating temperature of the fuel cells is not higher than a preset reference temperature. This arrangement effectively prevents or at least restrains the potential deterioration of power generation performance of the fuel cells, due to a decrease in operating temperature of the fuel cells.

The present invention is also directed to a second energy output device that has multiple energy output sources including fuel cells and activates at least one of the multiple energy output sources to output energy. The second energy output device includes: an output control module that stops power generation by the fuel cells under a preset condition and activates an energy output source other than the fuel cells included in the energy output device to output energy; an estimation module that carries out estimation during a stop of the fuel cells, where the estimation determines whether continuance of the stop of the fuel cells leads to a potential performance deterioration of the fuel cells at a restart of the fuel cells; and a forced FC operation module that, when the estimation module estimates the potential performance deterioration of the fuel cells, forcibly starts power generation of the fuel cells even under the preset condition.

The second energy output device of the invention immediately starts the operation of the fuel cells, in response to estimation of the potential performance deterioration of the fuel cells. This arrangement effectively prevents the potential performance deterioration of the fuel cells at a restart of the fuel cells.

In the second energy output device of the invention, the estimation module may estimate the potential performance deterioration of the fuel cells when an operating temperature of the fuel cells is not higher than a preset reference temperature. This arrangement effectively prevents or at least restrains the potential deterioration of power generation performance of the fuel cells, due to a decrease in operating temperature of the fuel cells.

The present invention is further directed to an energy output device that has multiple energy output sources including fuel cells and activates at least one of the multiple energy output sources to output energy. The third energy output device includes: an output control module that stops power generation by the fuel cells under a preset condition and activates an energy output source other than the fuel cells included in the energy output device to output energy; fuel cell auxiliary machinery that is operated with power generation of the fuel cells; an estimation module that detects an operating state of the fuel cell auxiliary machinery during power generation of the fuel cells and determines whether the fuel cell auxiliary machinery is in an abnormal transient state, which is a transient state preliminary to diagnosis of an abnormality, based on the detected operating state; and a forced FC operation module that, when the estimation module determines that the fuel cell auxiliary machinery is in the abnormal transient state, forcibly continues power generation of the fuel cells even under the preset condition.

The third energy output device of the invention continues power generation of the fuel cells when it is determined that the fuel cell auxiliary machinery is in the abnormal transient state. The operating state of the fuel cell auxiliary machinery is thus continuously monitored. This arrangement ensures quick detection of a trouble or failure arising in the fuel cell auxiliary machinery.

In the third energy output device of the invention, the estimation module further detects a temperature of the fuel cell auxiliary machinery and determines that the fuel cell auxiliary machinery is in the abnormal transient state when the detected temperature of the fuel cell auxiliary machinery is not lower than a preset reference temperature.

While power generation of the fuel cells continues, the temperature rise of the fuel cell auxiliary machinery is continuously monitored. This arrangement thus ensures quick detection of a failure or trouble arising in the fuel cell auxiliary machinery.

The technique of the invention is not restricted to the energy output device discussed above, but may be actualized by diversity of other applications, for example, a control method of the energy output device and a moving body with the energy output device mounted thereon as a power source.

BEST MODES OF CARRYING OUT THE INVENTION

The energy output device of the invention and the control method of the energy output device are discussed below in detail with reference to a preferred embodiment with the accompanied drawings.

A. General System Configuration

Figure 1:
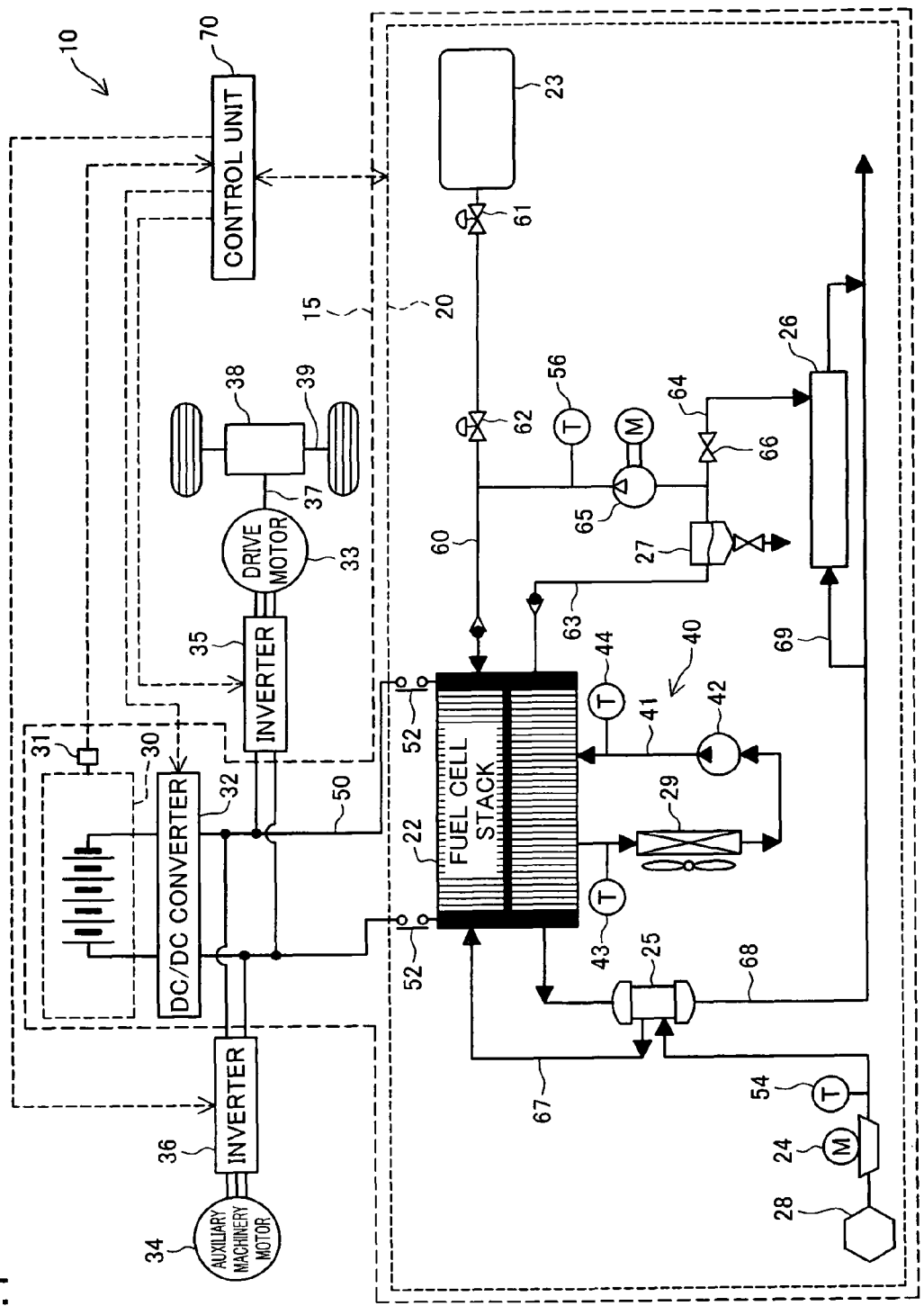
FIG. 1 is a block diagram schematically illustrating the configuration of an electric vehicle in one embodiment of the invention.

FIG. 1 is a block diagram schematically illustrating the configuration of an electric vehicle 10 in one embodiment of the invention. The electric vehicle 10 includes a drive motor 33 and an auxiliary machinery motor 34 as loads of consuming electric power, and a power supply device 15 as a power source of supplying electric power to these loads. The power supply device 15 is connected with the loads by wiring 50, so that electric power is transmitted between the power supply device 15 and the loads.

The power supply device 15 includes a fuel cell unit 20 and a secondary battery 30. The fuel cell unit 20 has a stack of fuel cells 22, which consists of a large number of unit cells laid one upon another (hereafter referred to as the fuel cell stack), as the main body of power generation. The secondary battery 30 is connected to the wiring 50 via a DC-DC converter 32. The DC-DC converter 32 and the fuel cell stack 22 are connected in series with the wiring 50. The wiring 50 has switches 52 to connect and disconnect the fuel cell stack 22 with and from the wiring 50.

The fuel cell unit 20 includes a hydrogen tank 23 for storing hydrogen to be supplied to the fuel cell stack 22 and an air compressor 24 for feeding a supply of the compressed air to the fuel cell stack 22, in addition to the fuel cell stack 22. The fuel cell stack 22 consists of polymer electrolyte fuel cells in this embodiment, although diversity of other fuel cells may also be applicable to the fuel cell stack 22.

The hydrogen tank 23 may be, for example, a high-pressure hydrogen tank or a tank of a hydrogen storage alloy absorbing hydrogen for storage. The hydrogen gas stored in the hydrogen tank 23 is led to a hydrogen gas supply conduit 60, is subjected to pressure reduction by a pressure reducing valve 61 set in the hydrogen gas supply conduit 60, goes through pressure regulation to a preset pressure level by means of a pressure regulator 62, and is supplied to anodes of the fuel cell stack 22. The anode exhaust discharged from the anodes is led through an anode exhaust conduit 63 and is flown into the hydrogen gas supply conduit 60. The remaining hydrogen gas in the anode exhaust is circulated through the flow path and is again subjected to electrochemical reactions.

A hydrogen pump 65 is set in the anode exhaust conduit 63 for circulation of the anode exhaust. An exhaust gas discharge conduit 64 is branched off from the anode exhaust conduit 63. The exhaust gas discharge conduit 64 has an open/close valve 66. In the open position of the open/close valve 66, part of the anode exhaust flowing through the anode exhaust conduit 63 is releasable to the atmosphere via the exhaust gas discharge conduit 64. The open/close valve 66 is provided to lower the concentration of impurity (the concentration of nitrogen) in the anode exhaust, which is circulated through the anode exhaust conduit 63 and is supplied to the anodes of the fuel cell stack 22 again. While the hydrogen gas is circulated through the anode exhaust conduit 63 and is re-supplied to the fuel cell stack 22, the progress of the electrochemical reactions gradually concentrates a trace amount of nitrogen included in the circulated hydrogen gas to raise the concentration of nitrogen. Potential leakage of nitrogen contained in the supply of air from cathodes to the anodes in the fuel cell stack 22 also raises the concentration of nitrogen in the hydrogen gas. In the electric vehicle 10 of the embodiment, the open/close valve 66 is set in the open position at preset time intervals to release part of the anode exhaust to the atmosphere and thereby restrain the rise in concentration of nitrogen included in the supply of hydrogen gas to the anodes. The open/close valve 66 may be set in the open position every time an accumulated power generation of the fuel cell stack 22 reaches a preset level, instead of at the preset time intervals.

The exhaust gas discharge conduit 64 is connected to a dilution unit 26 having a greater cross sectional area than the exhaust gas discharge conduit 64. The dilution unit 26 is designed to dilute the remaining hydrogen included in the anode exhaust with cathode exhaust (discussed later), prior to release of the anode exhaust to the atmosphere.

A gas-liquid separator 27 is located in the anode exhaust conduit 63. Water is produced at the cathodes with progress of the electrochemical reactions. The water partly enters into the anode exhaust via electrolyte membranes. The gas-liquid separator 27 condenses the steam accumulated in the anode exhaust on the inner wall surface of the low-temperature gas-liquid separator 27 for removal of the steam from the anode exhaust.

The air compressor 24 feeds a supply of the compressed air as an oxidizing gas to the cathodes of the fuel cell stack 22 via an oxidizing gas supply conduit 67. The ambient air is taken via an air flowmeter 28 with a filter and is compressed by the air compressor 24. The cathode exhaust discharged from the cathodes is led through a cathode exhaust conduit 68 and is released to the atmosphere. The oxidizing gas supply conduit 67 and the cathode exhaust conduit 68 go through a humidifier module 25. In the humidifier module 25, part of the wall of the oxidizing gas supply conduit 67 is in contact with part of the wall of the cathode exhaust conduit 68, and a steam-permeable membrane is set at the contact. The steam-permeable membrane parts the oxidizing gas supply conduit 67 from the cathode exhaust conduit 68. This structure enables steam to be supplied from the cathode exhaust to the compressed air. The cathode exhaust contains water produced through the electrochemical reactions in the state of steam. The humidifier module 25 humidifies the compressed air with the steam-containing cathode exhaust, prior to supply to the cathodes. An exhaust gas branch conduit 69 is branched off from the cathode exhaust conduit 68. The exhaust gas branch conduit 69 goes through the dilution unit 26 and is again joined with the cathode exhaust conduit 68. The anode exhaust flown into the dilution unit 26 via the exhaust gas discharge conduit 64 is mixed and diluted with part of the cathode exhaust in the dilution unit 26 and is then flown to the cathode exhaust conduit 68 to be further diluted with the remaining cathode exhaust, before being released to the atmosphere.

The fuel cell unit 20 further includes a cooling system 40, which functions to cool down the fuel cell stack 22 and keep the operating temperature of the fuel cell stack 22 at a preset level. The cooling system 40 includes a cooling water flow path 41, a cooling pump 42, and a radiator 29. Cooling water is flown through the cooling water flow path 41 and is thus circulated between the inside of the fuel cell stack 22 and the radiator 29. The cooling pump 42 functions to circulate the cooling water through the cooling water flow path 41. The radiator 29 has a cooling fan and cools down the cooling water heated through the fuel cell stack 22. Temperature sensors 43 and 44 are arranged in the vicinity of the joint of the cooling water flow path 41 with the fuel cell stack 22 to measure the temperature of the cooling water. The operating amounts of the cooling fan and the cooling pump 42 are regulated according to the detection results of the temperature sensors 43 and 44, so as to regulate the operating temperature of the fuel cell stack 22. The set of these units working with power generation of the fuel cell stack 22, for example, the air compressor 24, the hydrogen pump 65, the cooling pump 42, the cooling fan of the radiator 29, and the valves set in the various flow paths, are hereafter referred to as the fuel cell auxiliary machinery.

The secondary battery 30 may be any of diverse known secondary batteries, for example, a lead battery, a nickel-cadmium battery, a nickel-hydrogen battery, or a lithium battery. As shown in FIG. 1, an SOC monitor 31 is attached to the secondary battery 30 to monitor the state of charge (SOC) of the secondary battery 30. In the structure of this embodiment, the SOC monitor 31 is an SOC meter that measures accumulation of the charge-discharge current of the secondary battery 30 and the time. The SOC monitor 31 may be a voltage sensor, instead of the SOC meter. The secondary battery 30 tends to lower its voltage with a decrease in its state of charge.

Measurement of the voltage thus leads to detection of the state of charge of the secondary battery 30.

When the state of charge of the secondary battery 30 is lowered to or below a preset level, the fuel cell stack 22 starts charging the secondary battery 30. In the braking state of the electric vehicle 10 (that is, in response to the driver's step-on action of a brake pedal during a run of the vehicle), the drive motor 33 works as a generator to generate electric power. The secondary battery 30 is also charged with this electric power generated by the drive motor 33.

The DC/DC converter 32 regulates the voltage of the wiring 50 according to the setting of a target output voltage and thereby regulates the output voltage of the fuel cell stack 22, so as to control the level of electric power output from the fuel cell stack 22. The DC/DC converter 32 also works as a switch of controlling the connection of the secondary battery 30 with the wiring 50. The connection between the secondary battery 30 and the wiring 50 is cut off when there is no demand of charge or discharge of the secondary battery 30.

The drive motor 33 as one of the loads that receive the supply of electric power from the power supply device 15 is a synchronous motor and has three-phase coils for formation of a rotating magnetic field. A supply of electric power is given from the power supply device 15 to the drive motor 33 via a drive inverter 35. The drive inverter 35 is constructed as a transistor inverter including multiple transistors as switching elements corresponding to the respective phases of the drive motor 33. An output shaft 37 of the drive motor 33 is linked to a vehicle drive shaft 39 via a reduction gear 38. The reduction gear 38 regulates the revolution speed of the power output from the drive motor 33 and transmits the output power to the vehicle drive shaft 39.

In the structure of FIG. 1, the auxiliary machinery motor 34 is another load of receiving the supply of electric power from the power supply device 15. The auxiliary machinery motor 34 is a collective form of multiple motors of the auxiliary machinery described above, that is, the air compressor 24, the cooling pump 42, and the hydrogen pump 65. The auxiliary machinery motor 34 receives the supply of electric power from the power supply device 15 via respective corresponding inverters (collectively shown as an inverter 36 in FIG. 1). The auxiliary machinery receiving the supply of electric power from the power supply device 15 also include the other fuel cell auxiliary machinery like the cooling fan of the radiator 29 and the valves set in the various flow paths, as well as an air conditioner mounted on the electric vehicle 10 and diverse electric devices on the vehicle. Among the auxiliary machinery, the devices having relatively low operating voltages (for example, the valves set in the flow paths) receive a supply of electric power via a preset step-down DC/DC converter (not shown).

The electric vehicle 10 further includes a control unit 70 that controls the respective constituents of the electric vehicle 10. The control unit 70 is constructed as a logic circuit including a microcomputer. The control unit 70 includes a CPU that executes various operations according to preset control programs, a ROM that stores control programs and control data required for execution of the various operations by the CPU, and a RAM which diverse data required for execution of the various operations by the CPU are temporarily written in and read from, and an input-output port that inputs and outputs diversity of signals. The control unit 70 receives detection signals from various sensors including the temperature sensors 43 and 44 discussed above, output signals from the SOC monitor 31, and information on the driving state of the vehicle, such as an accelerator opening and a vehicle speed (not shown). The control unit 70 outputs driving signals to, for example, the DC/DC converter 32, the drive inverter 35, and the pumps and valves set in the flow paths included in the fuel cell unit 20.

B. Drive Control with Intermittent Drive

In the structure of this embodiment, the fuel cell unit 20 mainly functions to supply the electric power required for driving the electric vehicle 10 in the ordinary state. In certain conditions that the operation of the fuel cell unit 20 undesirably lowers the energy efficiency, however, the control stops the operation of the fuel cell unit 20 (intermittent drive mode) and starts the supply of electric power from the secondary battery 30. The control procedure of the embodiment determines whether the intermittent drive mode is to be actually activated, when at least one of conditions of setting the intermittent drive mode in the power supply device 15 is fulfilled according to the variation in energy efficiency. The description first regards the drive control in the ordinary state and the drive control in the intermittent drive mode.

Figure 2A:
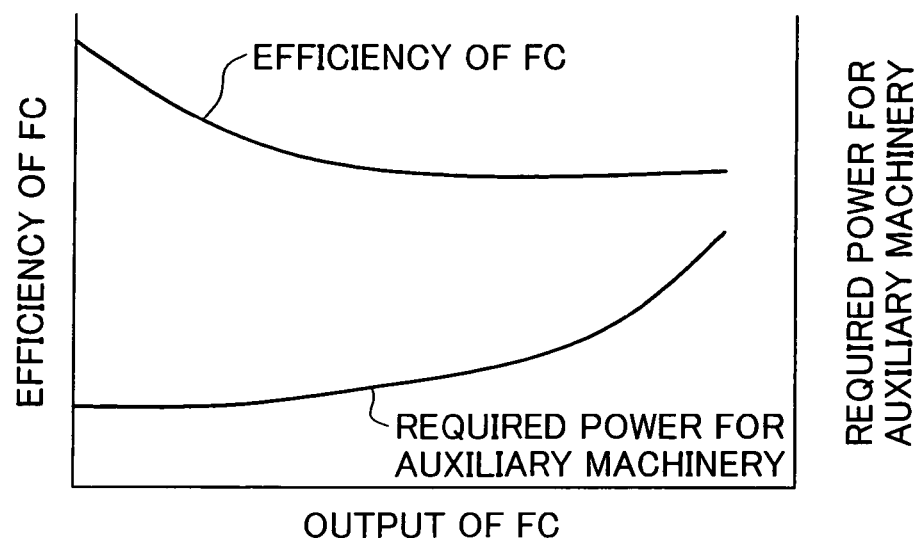
FIG. 2A-2B are graphs showing a variation in total energy efficiency of a fuel cell unit plotted against the output of a fuel cell stack.
Figure 2B:
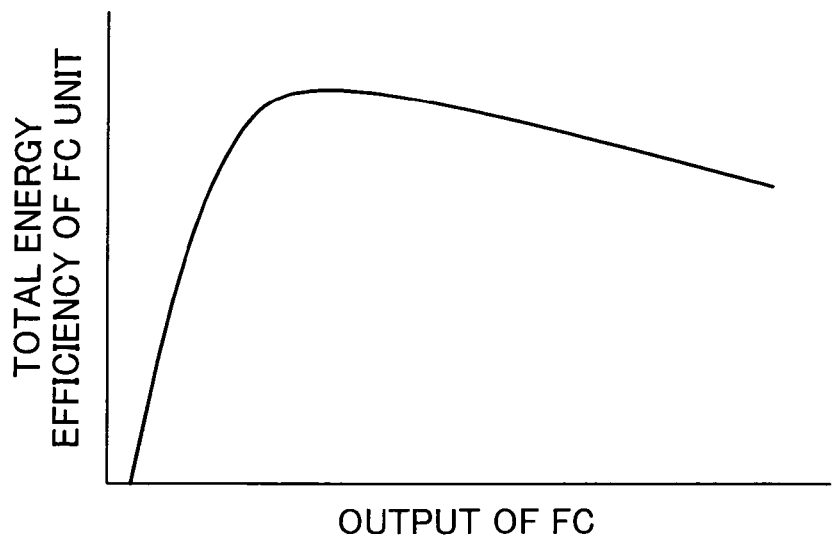

The levels of power generation of the fuel cell stack 22 and the secondary battery 30 are regulated to enhance the overall efficiency of the power supply device 15. FIG. 2 is graphs showing a variation in total energy efficiency of the fuel cell unit 20 plotted against the output of the fuel cell stack 22. The graph of FIG. 2(A) shows a variation in efficiency of the fuel cell stack 22 and a variation in power required for the fuel cell auxiliary machinery plotted against the output of the fuel cell stack 22. As shown in the graph of FIG. 2(A), the efficiency of the fuel cell stack 22 gradually lowers with an increase in output of the fuel cell stack 22. The required power for the fuel cell auxiliary machinery, that is, the energy consumed for driving the fuel cell auxiliary machinery, increases with an increase in output of the fuel cell stack 22. While the fuel cell stack 22 has a significantly small output, the ratio of the required power for the auxiliary machinery to the output of the fuel cell stack 22 is very high. As shown in the graph of FIG. 2(B), the total energy efficiency of the fuel cell unit 20 depending upon the efficiency of the fuel cell stack 22 and the required power for the auxiliary machinery is accordingly low in a low loading state, is maximized at a preset level of the output of the fuel cell stack 22, and is gradually lowered in a higher loading state.

In the electric vehicle 10 of the embodiment, the control procedure stops the operation of the fuel cell stack 22, as a rule, in the low loading state where the total energy efficiency of the fuel cell unit 20 is low, thus preventing a decrease in overall energy efficiency of the power supply device 15. While the fuel cell stack 22 is activated to generate electric power, the control procedure restricts the power supply only to the output from the fuel cell stack 22 in the preset loading state where the total energy efficiency of the fuel cell stack 20 is significantly high. The control procedure receives the power supply from both the fuel cell stack 22 and the secondary battery 30 in the higher loading state.

The output from the power supply device 15 is affected by the state of charge (SOC) of the secondary battery 30. When the secondary battery 30 has a sufficient level of the SOC, partial output from the secondary battery 30 may enhance the overall energy efficiency of the power supply device 15. When the secondary battery 30 has an insufficient level of the SOC, on the other hand, the secondary battery 30 is to be charged by the fuel cell stack 22. In order to enhance the overall energy efficiency of the power supply device 15, the control procedure of the embodiment sets target power generation levels of the fuel cell stack 22 and the secondary battery 30 according to the load demand (power supply device power demand discussed later) and the SOC of the secondary battery 30 and stores the settings of the target power generation levels in the form of a map (power distribution map) in the control unit 70.

In the description hereafter, the drive mode that stops power generation of the fuel cell stack 22 and restricts the power supply to the output from the secondary battery 30 under the conditions of a relatively low load demand is called the 'intermittent drive mode'. The drive mode that activates the fuel cell stack 22 to generate electric power is called the 'FC drive mode'.

In the intermittent drive mode, the fuel cell auxiliary machinery stops the operations, and the supplies of hydrogen gas and the air to the fuel cell stack 22 are cut off. The switches 52 are set in the open position to disconnect the fuel cell stack 22 from the wiring 50.

Figure 3:
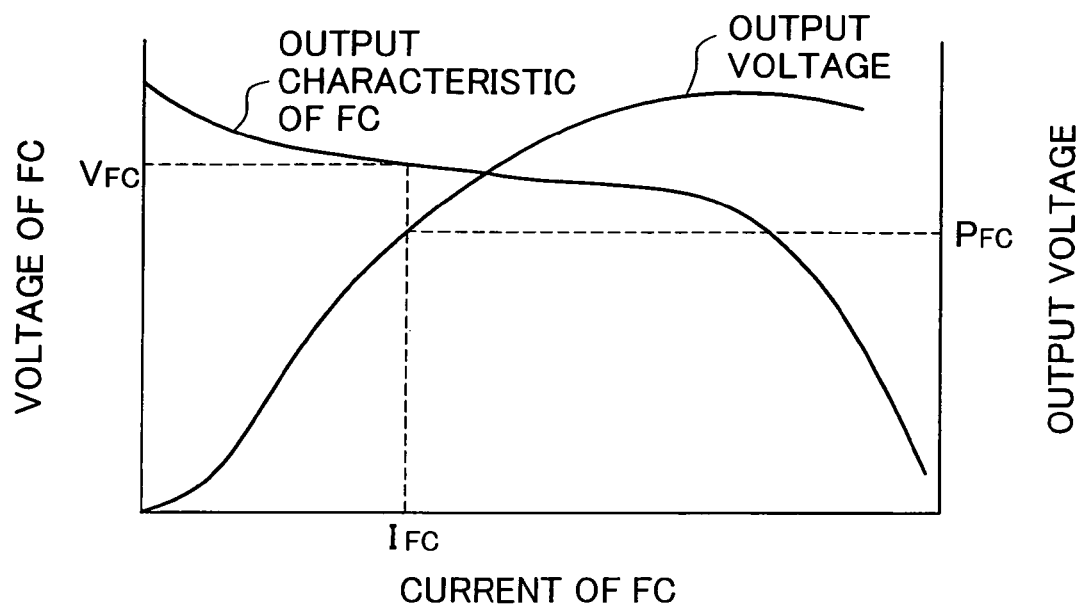
FIG. 3 is a graph showing variations in output voltage and output power plotted against the output current of the fuel cell stack.

In the FC drive mode, the levels of power generation to be output from the fuel cell stack 22 and the secondary battery 30 are regulated according to the output voltage of the DC/DC converter 32. FIG. 3 is a graph showing variations in output voltage and output power of the fuel cell stack 22 plotted against the output current of the fuel cell stack 22. As shown in the graph of FIG. 3, setting a target electric power $P_{FC}$ to be output from the fuel cell stack 22 automatically determines a magnitude of output current $I_{FC}$ from the fuel cell stack 22. According to the output characteristic of the fuel cell stack 22, determination of the output current $I_{FC}$ leads to setting of an output voltage $V_{FC}$ of the fuel cell stack 22. In the FC drive mode, the control unit 70 sets the target electric power $P_{FC}$ to be output from the fuel cell stack 22 by referring to the power distribution map and gives the setting of the output voltage $V_{FC}$ as a target voltage to the DC/DC converter 32. The control procedure drives the fuel cell auxiliary machinery to ensure the supplies of hydrogen gas and the air satisfying the target power generation level of the fuel cell stack 22 and outputs a driving signal to the inverter 35 according to the load demand. Desired levels of electric power are thus supplied from the fuel cell stack 22 and the secondary battery 30 to the respective loads.

Figure 4:
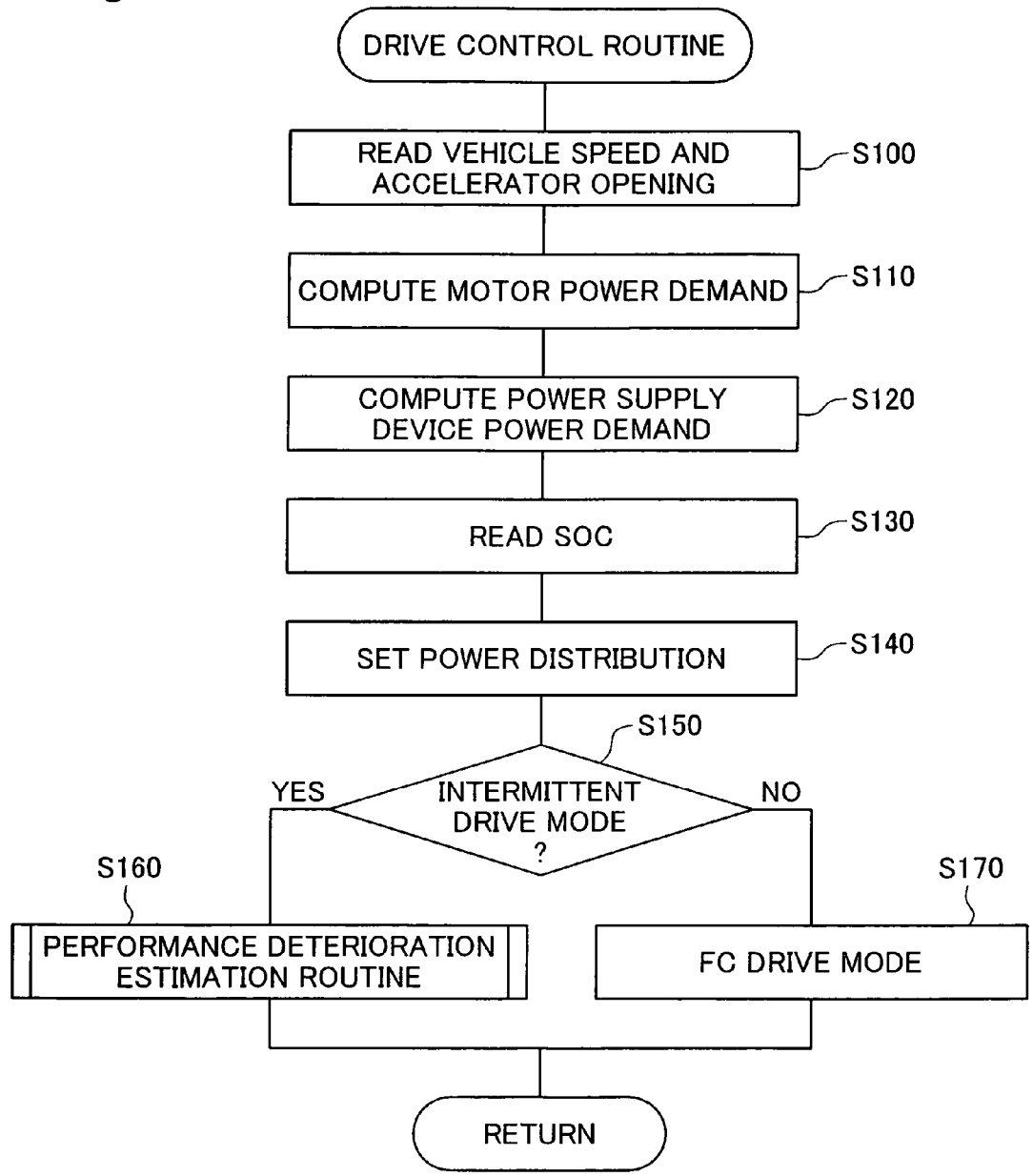
FIG. 4 is a flowchart showing a drive control routine.

FIG. 4 is a flowchart showing a drive control routine executed by the control unit 70 in the electric vehicle 10. This drive control routine is carried out repeatedly during a run of the electric vehicle 10.

When the drive control routine starts, the control unit 70 first receives information on the vehicle speed and the accelerator opening (step S100), and sequentially computes a power demand $P_{Mreq}$ of the drive motor 33 (motor power demand $P_{Mreq}$) according to the input accelerator opening and vehicle speed (step S110) and a power demand $P_{req}$ of the power supply device 15 (power supply device power demand $P_{req}$) (step S120). The power supply device power demand $P_{req}$ is the total sum of the motor power demand $P_{Mreq}$ and a power demand of the other loads (including the fuel cell auxiliary machinery and the air conditioner mounted on the electric vehicle 10) and represents the total electric power to be output from the power supply device 15.

After computation of the power supply device power demand $P_{req}$, the control unit 70 reads the SOC of the secondary battery 30 from the SOC monitor 31 (step S130) and refers to the power distribution map to set target power generation levels (power distribution) to be output from the fuel cell stack 22 and the secondary battery 30 according to the input SOC and the computed power supply device power demand $P_{req}$ (step S140). The control unit 70 then determines whether the settings of the power distribution at step S140 correspond to the intermittent drive mode (step S150). When the settings of the power distribution correspond to the intermittent drive mode, the control unit 70 executes a performance deterioration estimation routine discussed later (step S160) and exits from this drive control routine. When the settings of the power distribution correspond to the FC drive mode, on the other hand, the control unit 70 outputs driving signals to the respective constituents of the electric vehicle 10 for the control in the FC drive mode to attain the settings of the power distribution at step S140 (step S170), before exiting from this drive control routine. The concrete procedure drives the fuel cell unit 20 and the DC/DC converter 32 to ensure output of the electric powers from the fuel cell stack 22 and the secondary battery 30 corresponding to the settings of the target power generation levels with reference to the power distribution map, while driving the inverters 35 and 36 and the other elements relating to the loading and the fuel cell auxiliary machinery according to the power supply device power demand $P_{req}$.

C. Drive Control to Prohibit Intermittent Drive

Figure 5:
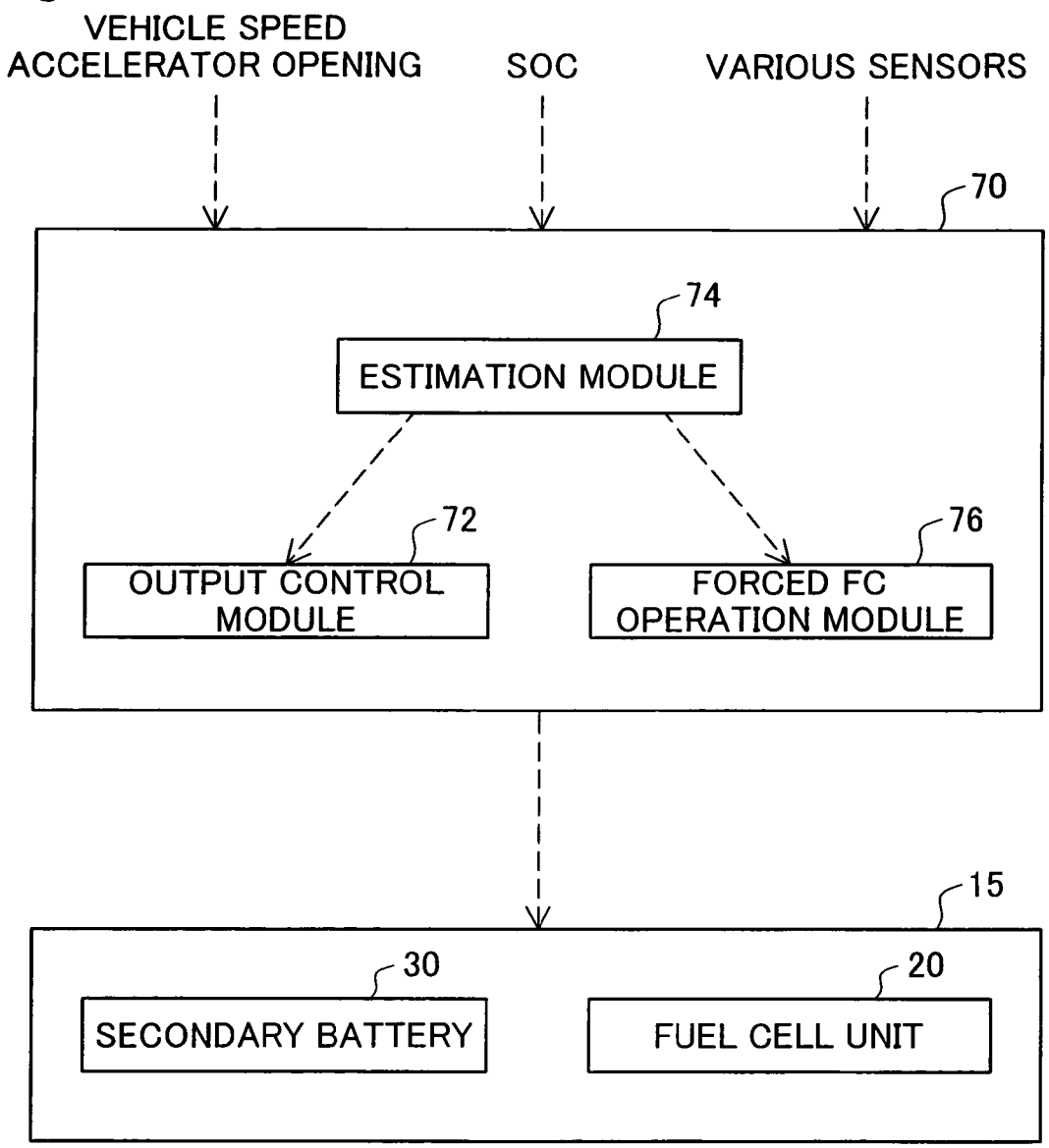
FIG. 5 is a block diagram showing the structure of circuits included in a control unit to determine whether an intermittent drive mode is to be activated.
Figure 6:
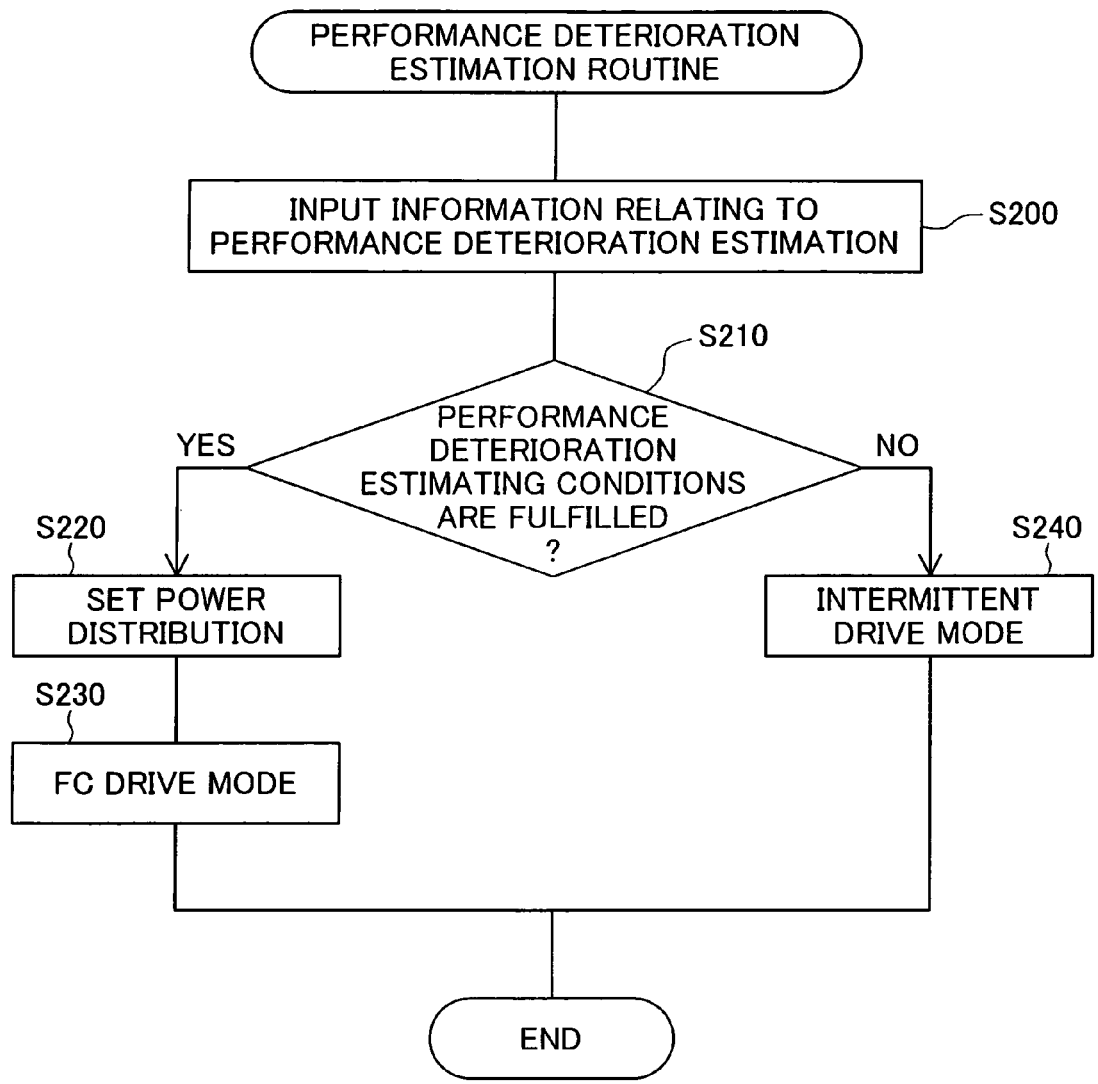
FIG. 6 is a flowchart showing a performance deterioration estimation routine.

In the electric vehicle 10 of the embodiment, when the settings of the power distribution at step S140 correspond to the intermittent drive mode, the control procedure determines whether the intermittent drive mode is to be actually activated, based on a result of performance deterioration estimation. FIG. 5 is a block diagram showing the structure of circuits included in the control unit 70 to determine whether the intermittent drive mode is to be activated. As shown in FIG. 5, the control unit 70 includes an output control module 72, an estimation module 74, and a forced FC operation module 76. FIG. 6 is a flowchart showing the performance deterioration estimation routine executed at step S160 in the drive control routine of FIG. 4 by the control unit 70 when it is determined at step S150 that the settings of the power distribution correspond to the intermittent drive mode. In response to determination that the settings of the power distribution correspond to the intermittent drive mode, the result of the determination at step S150 and the settings of the power distribution at step S140 are sent to the output control module 72 of the control unit 70, simultaneously with execution of the performance deterioration estimation routine at step S160.

When the performance deterioration estimation routine starts, the control unit 70 first inputs information relating to performance deterioration estimation (step S200). The estimation module 74 of the control unit 70 then determines whether at least one of performance deterioration estimating conditions is fulfilled, based on the input information relating to performance deterioration estimation (step S210).

When the fuel cell stack 22 is currently driven in the FC drive mode, the performance deterioration estimating conditions represent conditions in which a selection of the intermittent drive mode to temporarily stop the operation of the fuel cell unit 20 may cause deterioration of the performance of the fuel cell stack 22 at a restart of the fuel cell unit 20. When the fuel cell stack 22 is currently not driven for power generation, on the other hand, the performance deterioration estimating conditions represent conditions in which continuance of the current stop of the fuel cell unit 20 may cause deterioration of the performance of the fuel cell stack 22 at a restart of the fuel cell unit 20.

The description first regards the performance deterioration estimating conditions during the operation of the fuel cell stack 22 in the FC drive mode. The information relating to performance deterioration estimation include, for example, the concentration of nitrogen included in the gas supplied to the anodes of the fuel cell stack 22, the output voltage of the fuel cell stack 22, the voltage of each unit cell of the fuel cell stack 22, and the operating temperature of the fuel cell stack 22.

A temporary stop of the fuel cell unit 20 under the condition of the raised concentration of nitrogen included in the gas supplied to the anodes of the fuel cell stack 22 may lower the power generation efficiency of the fuel cell stack 22 at a restart of the fuel cell unit 20 and deteriorate the output characteristic (that is, the current-voltage characteristic representing a variation in output voltage against the output current) of the fuel cell stack 22. In this embodiment, the raised concentration of nitrogen included in the gas supplied to the anodes is accordingly set as one of the performance deterioration estimating conditions.

The concentration of nitrogen included in the anode supply gas may be estimated from an elapse of time after a latest valve-opening operation of the open/close valve 66 or from an accumulated power generation in the fuel cell stack 22 after the latest valve-opening operation of the open/close valve 66. The control procedure of this embodiment continuously measures the elapse of time and the accumulation of power generation. The control unit 70 accordingly estimates the concentration of nitrogen included in the anode supply gas with reference to the measurements of the elapse of time and the accumulation of power generation at step S200 and determines that one of the performance deterioration estimating conditions is fulfilled at step S210 when the estimated concentration of nitrogen exceeds a preset reference level. Estimation of the nitrogen concentration is, however, not essential. Fulfillment of one of the performance deterioration estimating conditions may be determined, simply based on the elapse of time after the latest valve-opening operation of the open/close valve 66. The control procedure sets in advance a nitrogen accumulation reference time, which is a reference time for estimation of a raised concentration of nitrogen included in the anode supply gas. It is determined that one of the performance deterioration estimating conditions is fulfilled, when the elapse of time after the latest valve-opening operation of the open/close valve 66 exceeds the nitrogen accumulation reference time. In another example, the control procedure may determine that one of the performance deterioration estimating conditions is fulfilled when the accumulation of power generation in the fuel cell stack 22 after the latest valve-opening operation of the open/close valve 66 exceeds a preset reference level for estimation of a raised concentration of nitrogen included in the anode supply gas.

In still another example, the control procedure may determine that one of the performance deterioration estimating conditions is fulfilled when the elapse of time after the latest valve-opening operation of the open/close valve 66 is within an immediate valve-opening reference time, which is significantly shorter than the nitrogen accumulation reference time. In response to the valve-opening operation of the open/close valve 66, the concentration of nitrogen is abruptly lowered in the neighborhood of the open/close valve 66 in the anode exhaust conduit 63, while the concentration of nitrogen is still kept relatively high inside the fuel cell stack 22 and in the other areas of the gas flow path. A certain time period is required after the valve-opening operation of the open/close valve 66 to homogenize the concentration of nitrogen in the gas flow path and sufficiently lower the concentration of nitrogen in the whole gas flow path. The immediate valve-opening reference time is accordingly set as the certain time period after the valve-opening operation of the open/close valve 66 required to sufficiently lower the concentration of nitrogen in the whole gas flow path. It is then determined that one of the performance deterioration estimating conditions is fulfilled when the elapse of time after the latest valve-opening operation of the open/close valve 66 is within the immediate valve-opening reference time.

When the elapse of time after the latest valve-opening operation of the open/close valve 66 is within the immediate valve-opening reference time, an additional problem arises that hydrogen remains at a relatively high concentration in the dilution unit 26, other than the disadvantage of the high nitrogen concentration in the anode supply gas. A stop of the fuel cell unit 20 stops operation of the air compressor 24 and cuts off the supply of the cathode exhaust to the dilution unit 26. A temporary stop of the fuel cell unit 20 immediately after the valve-opening operation of the open/close valve 66 may thus cause the relatively high concentration of hydrogen to be discharged from the dilution unit 26 to the atmosphere when the air compressor 24 resumes operation at a restart of the fuel cell unit 20. The elapse of only a very short time after the latest valve-opening operation of the open/close valve 66 (within the immediate valve-opening reference time) accordingly leads to the disadvantageous discharge of the relatively high concentration of hydrogen, in addition to the potential deterioration of the power generation performance of the fuel cell stack 22 due to the high concentration of nitrogen in the anode supply gas.

The output voltage of the fuel cell stack 22 and the voltage of any of the respective unit cells constituting the fuel cell stack 22 may be lowered when the electrolyte membranes of the fuel cell stack 22 have insufficient water content or when condensed water is accumulated in the gas flow path of the fuel cell stack 22 to interfere with the smooth gas flow. A temporary stop of the fuel cell unit 20 under the condition of the insufficient water content of the electrolyte membranes or under the condition of accumulation of condensed water in the gas flow path may lower the power generation efficiency of the fuel cell stack 22 at a restart of the fuel cell unit 20 and deteriorate the current-voltage characteristic. In this embodiment, the lowered output voltage of the fuel cell unit 22 and the lowered voltage of any of the respective unit cells constituting the fuel cell stack 22 are accordingly set as the performance deterioration estimating conditions.

The power supply device 15 of the embodiment includes an ammeter to measure the output current of the fuel cell stack 22, a voltmeter to measure the output voltage of the fuel cell stack 22 (the voltage of the wiring 50), and unit cell voltmeters to measure the voltages of the respective unit cells constituting the fuel cell stack 22 (not shown). At step S200 in the performance deterioration estimation routine of FIG. 6, the control unit 70 inputs detection signals from the ammeter, the voltmeter, and the respective unit cell voltmeters. When the output voltage relative to the output current is lower than a preset reference level, the control unit 70 determines at step S210 that one of the performance deterioration estimating conditions is fulfilled. The preset reference level is an allowable level for continuance of power generation but is lower than the standard level to suggest the potential for the insufficient water content of the electrolyte membranes or for accumulation of the condensed water. The structure of this embodiment measures both the output voltage of the whole fuel cell stack 22 and the voltages of the respective unit cells constituting the fuel cell stack 22. Measurement of the voltages of the respective unit cells is especially important for estimation of a potential trouble at an earlier timing. Such measurement leads to early detection of the insufficient level of the water content in the electrolyte membrane of a certain unit cell or accumulation of condensed water in part of the gas flow path included in a certain unit cell.

A decrease in operating temperature of the fuel cell stack 22 also leads to deterioration of the current-voltage characteristic of the fuel cell stack 22. A stop of the fuel cell unit 20 at the onset of a temperature decrease of the fuel cell stack 22 further lowers the temperature of the fuel cell stack 22 and may significantly deteriorate the output characteristic of the fuel cell stack 22 at a restart of the fuel cell unit 20. Application of large loading to the fuel cell stack 22 under the condition of the lowered temperature of the fuel cell stack 22 may cause a reaction different from the standard electrochemical reactions to proceed in the fuel cell stack 22 and significantly lower the power generation efficiency of the fuel cell stack 22. In this embodiment, the lowered operating temperature of the fuel cell stack 22 is accordingly set as one of the performance deterioration estimating conditions.

The operating temperature of the fuel cell stack 22 may be measured directly with a temperature sensor attached to the fuel cell stack 22. The operating temperature of the fuel cell stack 22 may otherwise be estimated from another observed temperature that reflects the operating temperature of the fuel cell stack 22. For example, the operating temperature of the fuel cell stack 22 is estimated according to the observed temperature by the temperature sensor 43 located in the cooling water flow path 41. In the performance deterioration estimation routine of FIG. 6, the control unit 70 inputs a detection signal from the temperature sensor at step S200 and determines at step S210 that one of the performance deterioration estimating conditions is fulfilled when the observed temperature is not higher than a preset level.

When the estimation module 74 determines that any of the performance deterioration estimating conditions is fulfilled at step S210 in the performance deterioration estimation routine of FIG. 6, that is, when the estimation module 74 estimates a potential performance deterioration of the fuel cell stack 22, this result of the estimation is sent to the forced FC operation module 76 of the control unit 70. The control unit 70 stores therein a power distribution map under intermittent drive prohibiting conditions, in addition to the general power distribution map discussed previously. In the general power distribution map, the level of electric power to be generated by the fuel ell stack 22 is set equal to zero in the low loading state with the low energy efficiency of the fuel cell unit 20. The power distribution map under intermittent drive prohibiting conditions, on the other hand, have settings of electric powers to be generated respectively by the fuel cell stack 22 and the secondary battery 30 even in the low loading state. Namely the fuel cell stack 22 is driven to generate electric power even in the low loading state. The forced FC operation module 76 refers to the power distribution map under intermittent drive prohibiting conditions and sets the levels of electric powers to be generated by the fuel cell stack 22 and the secondary battery 30 (power distribution) (step S220). The forced FC operation module 76 outputs driving signals to the respective relevant elements of the power supply device 15 for the control in the FC drive mode, so as to attain the settings of the power distribution at step S220 (step S230). The performance deterioration estimation routine is then terminated. When the estimation module 74 determines that any of the performance deterioration estimating conditions is fulfilled at step S210, this result of the estimation is also sent to the output control module 72 of the control unit 70. This cancels out the determination sent to the output control module 72 at step S150 in the drive control routine of FIG. 4 (that is, the determination that the power distribution corresponds to the intermittent drive mode), as well as the settings of the power distribution corresponding to the intermittent drive mode.

When the estimation module 74 determines that none of the performance deterioration estimating conditions is fulfilled at step S210, that is, when the estimation module 74 estimates no potential performance deterioration of the fuel cell stack 22, on the other hand, this result of the estimation is sent to the output control module 72 of the control unit 70. The output control module 72 outputs driving signals to the respective relevant elements of the power supply device 15 to attain the settings of the power distribution corresponding to the intermittent drive mode transmitted at step S150 in the drive control routine of FIG. 4. This executes the control in the intermittent drive mode and causes the secondary battery 30 to output an electric power equivalent to the power supply device power demand Preq (step S240). The performance deterioration estimation routine is then terminated.

As described above, the power supply device 15 of the embodiment does not adopt the intermittent drive mode regardless of the energy efficiency of the power supply device 15, when any of the performance deterioration estimating conditions is fulfilled. This arrangement desirably prevents potential deterioration of the performance of the fuel cell stack 22.

When the fulfilled performance deterioration estimating condition is the raised concentration of nitrogen in the anode supply gas, continuing power generation of the fuel cell stack 22 triggers a valve-opening operation of the open/close valve 66 to lower the concentration of nitrogen in the anode supply gas. This arrangement effectively prevents or at least restrains the potential deterioration of the performance of the fuel cell stack 22. When only a short time period has elapsed after a latest valve-opening operation of the open/close valve 66, prohibition of the intermittent drive mode desirably prevents the disadvantageous discharge of the relatively high concentration of hydrogen to the atmosphere. The deterioration of performance of the fuel cell stack 22 includes not only the disadvantages relating to the performance of the fuel cell stack 22 but the disadvantages accompanied with the operations of the fuel cell stack 22.

When the fulfilled performance deterioration estimating condition is the lowered output voltage of the fuel cell stack 22 or the lowered voltage of any of the respective unit cells constituting the fuel cell stack 22, continuing power generation of the fuel cell stack 22 ensures recovery of the water content to a sufficient level in the electrolyte membranes and removal of condensed water from the gas flow path and thereby effectively prevents or at least restrains the potential deterioration of the performance of the fuel cell stack 22. As long as regulation of the gas flow rate and humidification of the gas are normally carried out in the fuel cell stack 22, continuing power generation recovers the level of the output voltage of the fuel cell stack 22 or the level of the voltage of any of the respective unit cells constituting the fuel cell stack 22 to a desired level.

When the fulfilled performance deterioration estimating condition is the lowered operating temperature of the fuel cell stack 22, continuing power generation of the fuel cell stack 22 takes advantage of the heat produced through the electrochemical reactions to control an excessive decrease in operating temperature of the fuel cell stack 22. This arrangement effectively prevents or at least restrains the potential deterioration of the performance of the fuel cell stack 22.

Continuing power generation of the fuel cell stack 22 eliminates the relevant performance deterioration estimating condition. In a next cycle of the performance deterioration estimation routine in the low loading state, the intermittent drive mode is then selectable to stop the operation of the fuel cell unit 20. After elimination of the performance deterioration estimating condition, restart of the fuel cell unit 20 with an increase in loading does not cause any deterioration of the performance of the fuel cell stack 22 described above.

The above description regards the performance deterioration estimating conditions determined when the fuel cell stack 22 is currently driven in the FC drive mode. The fuel cell unit 20 is similarly controlled while the fuel cell stack 22 is currently not driven for power generation. The information input at step S200 in the performance deterioration estimation routine of FIG. 6 under the condition of inactivation of the fuel cell stack 22 for power generation (that is, in the intermittent drive mode) is, for example, the operating temperature of the fuel cell stack 22. When the operating temperature of the fuel cell stack 22 is lowered to or below a preset reference level, the control procedure determines that one of the performance deterioration estimating conditions is fulfilled and immediately activates the fuel cell unit 20 (sets the fuel cell stack 22 in the FC drive mode). This controls the decrease in operating temperature of the fuel cell stack 22 and thereby prevents potential deterioration of the power generation performance. Such control effectively prevents potential deterioration of the performance of the fuel cell stack 22 at a restart of the fuel cell unit 20, due to the continuance of the intermittent drive mode.

Instead of direct measurement of the operating temperature of the fuel cell stack 22, the operating temperature of the fuel cell stack 22 may be estimated according to a time period elapsing since a start of the intermittent drive mode. It is determined at step S210 that one of the performance deterioration estimating conditions is fulfilled, when the elapse of time period exceeds a preset reference time. This arrangement restricts the sustainable time of the intermittent drive mode to the preset reference time and prohibits further continuance of the intermittent drive mode. This arrangement effectively prevents or at least restrains an excessive decrease in operating temperature of the fuel cell stack 22, due to the continuance of the intermittent drive mode. Restriction of the sustainable time of the intermittent drive mode also prevents or at least restrains the disadvantageous shortage of the water content in the electrolyte membranes, due to the continuance of the intermittent drive mode. In addition to or in place of the restriction of the sustainable time of the intermittent drive mode, the control procedure may give a restriction to a restart time when the intermittent drive mode resumes after a shift from the intermittent drive mode to the FC drive mode. In this case, the control procedure inputs a time period elapsing since termination of the intermittent drive mode at step S200 and determines at step S210 that one of the performance deterioration estimating conditions is fulfilled when the elapse of time period is less than a preset reference time. This arrangement assures some time of power generation by the fuel cell stack 22 after the setting of the intermittent drive mode, so as to keep the operating temperature of the fuel cell stack 22 at a sufficiently high level and to maintain the sufficient moisture level of the electrolyte membranes.

The information input in the intermittent drive mode at step S200 in the performance deterioration estimation routine of FIG. 6 may be OCV (open-circuit voltages) at the respective unit cells constituting the fuel cell stack 22. Accumulation of condensed water in the gas flow path in a certain unit cell prevents a rise of the OCV to a standard level. It is accordingly determined that one of the performance deterioration estimating conditions is fulfilled, when the OCV is not greater than a preset reference voltage. During the operation of the fuel cell unit 20 in the intermittent drive mode, when the OCV input at step S200 is not greater than the preset reference voltage, the control procedure immediately starts the FC drive mode at step S230. This arrangement resumes the gas supply to the fuel cell stack 22 to eliminate accumulation of condensed water and thereby prevents the potential deterioration of the performance of the fuel cell unit 20.

D. Second Embodiment

The procedure of the first embodiment prohibits the intermittent drive mode, when the potential deterioration of the fuel cell stack 22 is expected at a restart of the fuel cell unit 20. The procedure of a second embodiment, on the other hand, prohibits the intermittent drive mode in response to detection of an abnormal transient state that is prior to detection of abnormality of any of the fuel cell auxiliary machinery included in the fuel cell unit 20.

Figure 7:
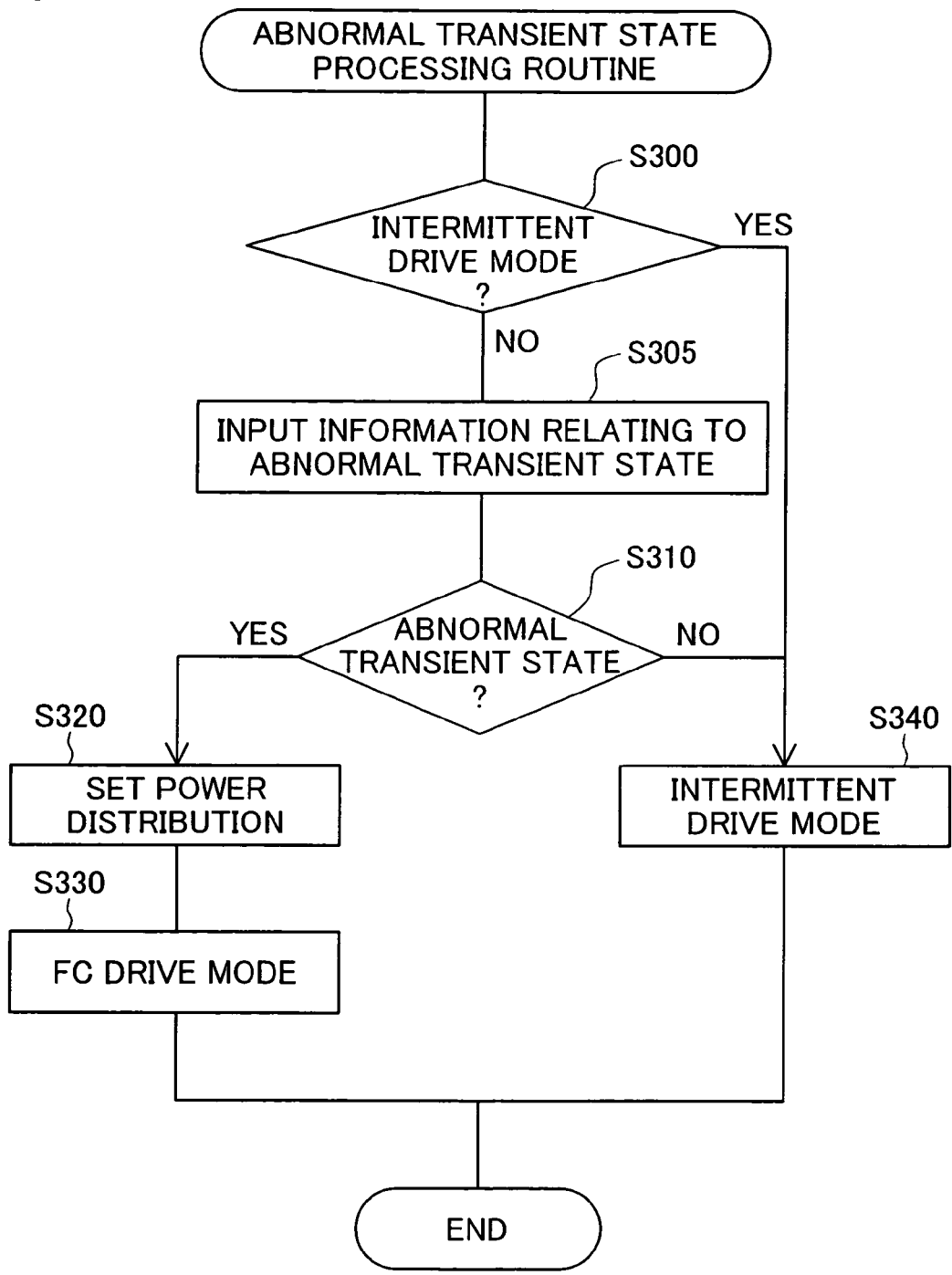
FIG. 7 is a flowchart showing an abnormal transient state processing routine.

An electric vehicle of the second embodiment has practically the same configuration as that of the electric vehicle 10 of the first embodiment. Like constituents are represented by like numerals and are not specifically described here. FIG. 7 is a flowchart showing an abnormal transient state processing routine, which is executed by the control unit 70 in the electric vehicle 10 of the second embodiment. This abnormal transient state processing routine is executed at step S160, in place of the performance deterioration estimation routine of the first embodiment (FIG. 6), when it is determined at step S150 that the settings of the power distribution correspond to the intermittent drive mode in the drive control routine of FIG. 4.

When the abnormal transient state processing routine starts, the control unit 70 first determines whether the fuel cell unit 20 is currently driven in the intermittent drive mode (step S300). When the fuel cell unit 20 is currently not driven in the intermittent drive mode, the control unit 70 inputs information relating to an abnormal transient state (step S305). The estimation module 74 of the control unit 70 then determines whether the current state is the abnormal transient state, based on the input information relating to the abnormal transient state (step S310).

The abnormal transient state represents any of preset conditions to be met prior to detection of any abnormality of the fuel cell auxiliary machinery included in the fuel cell unit 20. More specifically the abnormal transient state means any of abnormality-relating conditions that cancels out detection of the abnormal transient state and prevents smooth detection of an existing abnormality by the setting of the intermittent drive mode to stop the fuel cell unit 20.

For estimation of the abnormal transient state, the control procedure of this embodiment receives the temperature of the compressed air supplied by the air compressor 24, the temperature of hydrogen gas supplied by the hydrogen pump 65, and the temperature of the inverter 36 at step S305. An air temperature sensor 54 is located in the supply flow path of the compressed air from the air compressor 24, and a hydrogen temperature sensor 56 is located in the supply flow path of the compressed hydrogen from the hydrogen pump 65 in the anode exhaust conduit 63 (see FIG. 1). A temperature sensor (not shown) is attached to the inverter 36 to measure the temperature of the inverter 36. The control unit 70 inputs detection signals from these sensors at step S305 in the abnormal transient state processing routine of FIG. 7.

Compression of the air or the hydrogen by the air compressor 24 or by the hydrogen pump 65 raises the temperature of the air or the hydrogen. When any trouble or failure arises in the air compressor 24 or in the hydrogen pump 65, the temperature of the air or the hydrogen gas may exceed a preset level and continue rising. When any trouble or failure arises in the inverter 36, the temperature of the inverter 36 may exceed a preset level and continue rising. In the structure of this embodiment, abnormal-state reference temperatures are set in advance with respect to the temperature of the compressed air, the temperature of the hydrogen gas, and the temperature of the inverter 36 and are stored in the control unit 70. The abnormal-state reference temperature exceeds a standard temperature range and is used as a criterion of determining the abnormal state to immediately stop the fuel cell unit 20. Abnormal transient-state reference temperatures are also set in advance with respect to the temperature of the compressed air, the temperature of the hydrogen gas, and the temperature of the inverter 36 and are stored in the control unit 70. The abnormal transient-state reference temperature is between the normal temperature range and the abnormal-state reference temperature and is used as a criterion of determining the abnormal transient state. The procedure of step S310 determines whether any of these three temperatures exceeds the respective abnormal transient-state reference temperatures for estimation of the abnormal transient state.

When the estimation module 74 determines that the current state is the abnormal transient state at step S310 in the abnormal transient state processing routine of FIG. 7, the result of the determination is sent to the forced FC operation module 76 of the control unit 70. The forced FC operation module 76 sets the power distribution (step S320) and outputs driving signals to the respective relevant elements of the power supply device 15 for the control in the FC drive mode, so as to attain the settings of the power distribution at step S320 (step S330). The abnormal transient state processing routine is then terminated. The processing of steps S320 and S330 is identical with the processing of steps S220 and S230 in the performance deterioration estimation routine of FIG. 6.

When the estimation module 74 determines that the current state is not the abnormal transient state at step S310, on the other hand, the result of the determination is sent to the output control module 72 of the control unit 70. The output control module 72 outputs driving signals to the respective relevant elements of the power supply device 15 to attain the settings of the power distribution corresponding to the intermittent drive mode transmitted at step S150 in the drive control routine of FIG. 4. This executes the control in the intermittent drive mode and causes the secondary battery 30 to output an electric power equivalent to the power supply device power demand Preq (step S340). The abnormal transient state processing routine is then terminated. The processing of step S340 is identical with the processing of step S240 in the performance deterioration estimation routine of FIG. 6.

When it is determined at step S300 that the fuel cell unit 20 is currently driven in the intermittent drive mode, the fuel cell unit 20 has already been at a stop and there is no need of determination of the abnormal transient state. The control unit 70 thus immediately goes to step S340 to continue the intermittent drive mode. The abnormal transient state processing routine is then terminated.

As described above, in the power supply device 15 of the second embodiment, a stop of the fuel cell unit 20 is prohibited in response to detection of the abnormal transient state in any of the air compressor 24, the hydrogen pump 65, and the inverter 36. This arrangement ensures continuance of detection of an existing abnormality. When the intermittent drive mode is set in the abnormal transient state, which is preliminary to the abnormal state, to stop the operation of the fuel cell unit 20, for example, the air compressor 24, which has the increasing temperature and has just been determined in the abnormal transient state, stops its operation to lower the temperature. At the time of restart of the fuel cell unit 20, a relatively long time is thus required before the temperature of the compressed air reaches the abnormality transient-state reference temperature again and the abnormal-state reference temperature. Namely it takes a long time to detect an exiting abnormality. The procedure of this embodiment prohibits a stop of the fuel cell unit 20 in response to detection of the abnormal transient state. This arrangement ensures quick detection of a trouble or failure arising, for example, in the air compressor 24.

The procedure of the second embodiment detects the abnormal transient state with respect to the air compressor 24, the hydrogen pump 65, and the inverter 36. The abnormal transient state may similarly be detected with respect to other fuel cell auxiliary machinery included in the fuel cell unit 20. Detection of the abnormal transient state in any of the fuel cell auxiliary machinery exerts the similar effects to those discussed above, as long as setting of the intermittent drive mode to stop the fuel cell unit 20 cancels out detection of the abnormal transient state and prevents smooth detection of an existing abnormality (for example, an abnormality with a temperature rise). For example, the control procedure may measure the temperature of the anode exhaust or the cathode exhaust discharged from the fuel cell stack 22 and detect an abnormal transient state of the fuel cell stack 22 with a temperature rise of the anode exhaust or the cathode exhaust. In another example, the control procedure may measure the pressure of the anode exhaust or the cathode exhaust discharged from the fuel cell stack 22 and detect an abnormal transient state (for example, damage of the electrolyte membrane) of the fuel cell stack 22 with a decrease in pressure of the anode exhaust or the cathode exhaust.

E. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

E1. Modified Example 1

In the first and the second embodiments discussed above, the control procedure determines a stop of the fuel cell unit 20, based on the overall energy efficiency of the power supply device 15. One modified control procedure may determine a stop of the fuel cell unit 20 and activate the secondary battery 30, based on another condition in addition to or in place of the overall energy efficiency of the power supply device 15. In the latter case, the similar effects to those discussed above are exerted by prohibiting the stop of the fuel cell unit 20 under the performance deterioration estimating conditions or in the abnormal transient state.

E2. Modified Example 2

In the structures of the first and the second embodiments discussed above, the power supply device 15 includes the fuel cell unit 20 and the secondary battery 30. The technique of the invention is also applicable to an energy output device that includes an internal combustion engine, in addition to or in place of the secondary battery 30. In a vehicle equipped with a fuel cell unit and an internal combustion engine, the driving power of the vehicle is suppliable from both the internal combustion engine and a motor that receives a supply of electric power from the fuel cell unit. In an energy output device with multiple energy output sources including fuel cells, the technique of the invention is applicable to control output of energy from at least one of the multiple energy output sources. In the energy output device, even when a preset condition, such as the overall energy efficiency, is fulfilled to stop power generation of the fuel cells, the control procedure prohibits the stop of the fuel cells under the performance deterioration estimating conditions or in the abnormal transient state. This arrangement exerts the similar effects to those discussed above.

E3. Modified Example 3

In the structures of the first and the second embodiments discussed above, the fuel cell unit 20 supplies the hydrogen gas of the high purity to the anodes and circulates the anode exhaust to the anodes. This structure is, however, not essential. For example, the technique of the invention is applicable to a power supply device with a fuel cell unit, which has a reformer to reform a hydrocarbon fuel like gasoline or alcohol and generate hydrogen. The power supply device including the fuel cell unit with the reformer may further has a secondary battery. The secondary battery is used as a primary power source, while the fuel cell unit is mainly used to charge the secondary battery. Power generation of the fuel cell unit is stopped when the secondary battery is fully charged. In this power supply device, even when the secondary battery is in the full charge state to stop the operation of the fuel cell unit, the control procedure prohibits the stop of the fuel cell unit under the performance deterioration estimating conditions or in the abnormal transient state. This arrangement exerts the similar effects to those discussed above.

In this modified structure, the concentration of the impurity in the electrode active substance-containing gas, as one of the performance deterioration estimating conditions, may be the concentration of impurity in a reformed gas (for example, the concentration of carbon monoxide) or the concentration of hydrogen in the reformed gas. While the reformed gas has a high concentration of impurity, continuous operation of the fuel cell unit desirably prevents a decrease in temperature of the reformer or a decrease in temperature of a reactor filled with a catalyst for purifying the reformed gas. The control procedure thus prohibits a stop of the fuel cell unit under the preset condition and thereby prevents a further decrease in temperature of the reformer or the reactor, which leads to a rise in concentration of impurity in the reformed gas over an allowable range at a restart of the fuel cell unit.

E4. Modified Example 4

In the first and the second embodiments discussed above, the power supply device 15 including the fuel cell unit 20 is mounted on the electric vehicle. The technique of the invention is also applicable to a stationary energy output device, such as a stationary power supply device including a fuel cell unit.

All changes within the meaning and range of equivalency of the claims are intended to be embraced therein. The scope and spirit of the present invention are indicated by the appended claims, rather than by the foregoing description.

The invention claimed is:

1. An energy output device that has multiple energy output sources including fuel cells and activates at least one of the multiple energy output sources to output energy, said energy output device comprising:

an output control module that is programmed to stop power generation by the fuel cells under a preset condition and to activate an energy output source other than the fuel cells included in said energy output device to output energy;

an estimation module that is programmed to carry out estimation during power generation of the fuel cells, the estimation determining whether a temporary stop of the fuel cells leads to a potential performance deterioration of the fuel cells at a restart of the fuel cells; and a forced FC operation module that, when said estimation module estimates the potential performance deterioration of the fuel cells, is programmed to forcibly continue power generation of the fuel cells even under the preset condition.

2. An energy output device in accordance with claim 1, wherein the potential performance deterioration of the fuel cells is deterioration of a current-voltage characteristic of the fuel cells.

3. An energy output device in accordance with claim 1, wherein said estimation module estimates the potential performance deterioration of the fuel cells when a concentration of an impurity included in an electrode active substance-containing gas supplied to the fuel cells is not lower than a preset level.

4. An energy output device in accordance with claim 3, said energy output device further comprising:

a hydrogen gas supply conduit that leads a supply of hydrogen gas to anodes of the fuel cells; and an exhaust circulation conduit that leads at least part of anode exhaust discharged from the anodes of the fuel cells to said hydrogen gas supply conduit, wherein said estimation module estimates the potential performance deterioration of the fuel cells when the concentration of the impurity included in the anode exhaust led to said hydrogen gas supply conduit is not lower than the preset level.

5. An energy output device in accordance with claim 4, wherein said exhaust gas circulation conduit has a gas purge unit that releases part of the anode exhaust to outside of said energy output device, and said estimation module estimates the potential performance deterioration of the fuel cells when a time period elapsing since a latest operation of the gas purge unit to release part of the anode exhaust is within a preset reference time.

6. An energy output device in accordance with claim 5, said energy output device further comprising:

a hydrogen dilution module that dilutes part of the anode exhaust released by the gas purge unit with cathode exhaust discharged from cathodes of the fuel cells and releases the diluted anode exhaust to the outside of said energy output device.

7. An energy output device in accordance with claim 2, wherein said estimation module estimates the potential performance deterioration of the fuel cells when an output voltage of the fuel cells relative to an output current is not greater than a preset reference voltage relative to the output current.

8. An energy output device in accordance with claim 1, wherein said estimation module estimates the potential performance deterioration of the fuel cells when an operating temperature of the fuel cells is not higher than a preset reference temperature.

9. An energy output device that has multiple energy output sources including fuel cells and activates at least one of the multiple energy output sources to output energy, said energy output device comprising:

an output control module that is programmed to stop power generation by the fuel cells under a preset condition and to activate an energy output source other than the fuel cells included in said energy output device to output energy;

an estimation module that is programmed to carry out estimation during a stop of the fuel cells, the estimation determining whether continuance of the stop of the fuel cells leads to a potential performance deterioration of the fuel cells at a restart of the fuel cells; and a forced FC operation module that, when said estimation module estimates the potential performance deterioration of the fuel cells, is programmed to forcibly start power generation of the fuel cells even under the preset condition.

10. An energy output device in accordance with claim 9, wherein said estimation module estimates the potential performance deterioration of the fuel cells when an operating temperature of the fuel cells is not higher than a preset reference temperature.

11. An energy output device that has multiple energy output sources including fuel cells and activates at least one of the multiple energy output sources to output energy, said energy output device comprising:
   an output control module that is programmed to stop power generation by the fuel cells under a preset condition and to activate an energy output source other than the fuel cells included in said energy output device to output energy;
   fuel cell auxiliary machinery that is programmed to operate with power generation of the fuel cells;
   an estimation module that is programmed to detect an operating state of the fuel cell auxiliary machinery during power generation of the fuel cells and determines whether the fuel cell auxiliary machinery is in an abnormal transient state, which is a transient state preliminary to diagnosis of an abnormality, based on the detected operating state; and
   a forced FC operation module that, when said estimation module determines that the fuel cell auxiliary machinery is in the abnormal transient state, is programmed to forcibly continue power generation of the fuel cells even under the preset condition.

12. An energy output device in accordance with claim 11, wherein said estimation module further detects a temperature of the fuel cell auxiliary machinery and determines that the fuel cell auxiliary machinery is in the abnormal transient state when the detected temperature of the fuel cell auxiliary machinery is not lower than a preset reference temperature.

13. An energy output device in accordance with claim 1, wherein the preset condition is based on an energy efficiency of said energy output device.

14. A control method of an energy output device that has multiple energy output sources including fuel cells and activates at least one of the multiple energy output sources to output energy, said control method comprising the steps of:
   (a) selecting a drive mode for outputting energy from said energy output device under a preset condition, between an FC power generation mode in which the fuel cells generate electric power and an FC stop mode in which power generation of the fuel cells is stopped and energy is output from an energy output source other than the fuel cells;
   (b) carrying out estimation during power generation of the fuel cells, where the estimation determines whether a temporary stop of the fuel cells leads to a potential performance deterioration of the fuel cells at a restart of the fuel cells;
   (c) in the case of selection of the FC stop mode in said step (a), canceling selection of the FC stop mode in response to estimation of the potential performance deterioration of the fuel cells in said step (b); and
   (d) driving and controlling the fuel cells and the energy output source other than the fuel cells to activate the FC power generation mode when selection of the FC stop mode is cancelled in said step (c), while driving and controlling the fuel cells and the energy output source other than the fuel cells to activate the drive mode selected in said step (a) when selection of the FC stop mode is not canceled in said step (c).

15. A control method of an energy output device that has multiple energy output sources including fuel cells and activates at least one of the multiple energy output sources to output energy, said control method comprising the steps of:
   (a) selecting a drive mode for outputting energy from said energy output device under a preset condition, between an FC power generation mode in which the fuel cells generate electric power and an FC stop mode in which power generation of the fuel cells is stopped and energy is output from an energy output source other than the fuel cells;
   (b) carrying out estimation during a stop of the fuel cells, where the estimation determines whether continuance of the stop of the fuel cells leads to a potential performance deterioration of the fuel cells at a restart of the fuel cells;
   (c) in the case of selection of the FC stop mode in said step (a), canceling selection of the FC stop mode in response to estimation of the potential performance deterioration of the fuel cells in said step (b); and
   (d) driving and controlling the fuel cells and the energy output source other than the fuel cells to activate the FC power generation mode when selection of the FC stop mode is cancelled in said step (c), while driving and controlling the fuel cells and the energy output source other than the fuel cells to activate the drive mode selected in said step (a) when selection of the FC stop mode is not canceled in said step (c).

16. A control method of an energy output device that has multiple energy output sources including fuel cells and activates at least one of the multiple energy output sources to output energy, said control method comprising the steps of:
   (a) selecting a drive mode for outputting energy from said energy output device under a preset condition, between an FC power generation mode in which the fuel cells generate electric power and an FC stop mode in which power generation of the fuel cells is stopped and energy is output from an energy output source other than the fuel cells;
   (b) detecting an operating state of fuel cell auxiliary machinery that is operated with power generation of the fuel cells, and determining whether the fuel cell auxiliary machinery is in an abnormal transient state, which is a transient state preliminary to diagnosis of an abnormality, based on the detected operating state;
   (c) in the case of selection of the FC stop mode in said step (a), canceling selection of the FC stop mode in response to determination that the fuel cell auxiliary machinery is in the abnormal transient state in said step (b); and
   (d) driving and controlling the fuel cells and the energy output source other than the fuel cells to activate the FC power generation mode when selection of the FC stop mode is cancelled in said step (c), while driving and controlling the fuel cells and the energy output source other than the fuel cells to activate the drive mode selected in said step (a) when selection of the FC stop mode is not canceled in said step (c).

* * * * *